(12) United States Patent
Tang

(10) Patent No.: US 8,144,285 B2
(45) Date of Patent: Mar. 27, 2012

(54) LIQUID CRYSTAL DISPLAY DEVICE

(75) Inventor: Fang Tang, Shenzhen (CN)

(73) Assignees: Innocom Technology (Shenzhen) Co., Ltd., Shenzhen, Guangdong Province (CN); Chimei Innolux Corporation, Miao-Li County (TW)

(*) Notice: Subject to any disclaimer, the term of this patent is extended or adjusted under 35 U.S.C. 154(b) by 388 days.

(21) Appl. No.: 12/454,877

(22) Filed: May 26, 2009

(65) Prior Publication Data
US 2009/0290092 A1   Nov. 26, 2009

(30) Foreign Application Priority Data
May 23, 2008   (CN) .......................... 2008 1 0067424

(51) Int. Cl.
G02F 1/1333   (2006.01)
G02F 1/1335   (2006.01)
(52) U.S. Cl. ........................................... 349/60; 349/65
(58) Field of Classification Search ................. 349/60, 349/65
See application file for complete search history.

(56) References Cited

U.S. PATENT DOCUMENTS

| | | | |
|---|---|---|---|
| 6,392,724 B2 * | 5/2002 | An et al. .......................... | 349/58 |
| 6,512,558 B2 * | 1/2003 | Kim ................................. | 349/58 |
| 6,561,664 B2 * | 5/2003 | Yachi et al. ..................... | 362/615 |
| 6,820,992 B2 * | 11/2004 | Yu et al. ......................... | 362/633 |
| 6,828,721 B2 * | 12/2004 | Wakita ........................... | 313/491 |
| 6,976,781 B2 | 12/2005 | Chu et al. | |
| 7,301,588 B2 * | 11/2007 | Ogawa ............................ | 349/58 |
| 7,593,070 B2 * | 9/2009 | Ogawa ............................ | 349/58 |
| 7,612,842 B2 * | 11/2009 | Tsai et al. ....................... | 349/58 |
| 7,626,654 B2 * | 12/2009 | Tsubokura et al. ............. | 349/60 |

FOREIGN PATENT DOCUMENTS
CN   1713040 A   12/2005
* cited by examiner

Primary Examiner — Rhonda Peace
(74) Attorney, Agent, or Firm — Altis Law Group, Inc.

(57) ABSTRACT

An exemplary liquid crystal display (LCD) device includes a liquid crystal panel, a light guide plate, and blocks. The light guide plate includes a light emitting surface and cutouts. The blocks engage the cutouts, forming an accommodating space. The liquid crystal panel is accommodated in the accommodating space, and attached on the light emitting surface.

20 Claims, 5 Drawing Sheets

LIQUID CRYSTAL DISPLAY DEVICE

BACKGROUND

1. Technical Field

The present disclosure relates to liquid crystal display (LCD) devices, and particularly to an LCD device without a frame.

2. Description of Related Art

LCD devices are commonly used as displays for compact electronic apparatuses due to not only good quality image using little power, but also a conveniently thin profile. The LCD device generally includes a liquid crystal panel and a backlight module, both accommodated in a plastic frame.

Referring to FIG. 8, a commonly used LCD device 1 includes a bottom tray 10, a backlight module 11, a liquid crystal panel 13, and a bezel 15. The backlight module 11 and the liquid crystal panel 13 are accommodated between the bottom tray 10 and the bezel 15.

The bezel 15 includes a top plate 150 and two opposite first sidewalls 152 extending perpendicularly from edges of the top plate 150. Each first sidewall 152 includes a plurality of first notches 156. The bottom tray 10 includes a bottom plate 100 and two opposite second sidewalls 102 extending perpendicularly from edges of the bottom plate 100. Each second sidewall 102 includes a plurality of second notches 104. The second sidewalls 102 are perpendicular to the first sidewalls 152.

The backlight module 11 includes a light guide plate 112, a light source 115, and a frame 116. The light guide plate 112 includes a light incident surface 120 to which light source 115 is adjacent. The frame 116 includes a supporting plate 162 and four third sidewalls 160 connected end to end. The supporting plate 162 is a hollow plate, with an opening corresponding to a window of the bezel 15. The supporting plate 162 extends inwardly and perpendicularly from inner sides of the four third sidewalls 160, thereby forming a first accommodating space and a second accommodating space. The four third sidewalls include a plurality of first protrusions 166 and second protrusions 164 corresponding to the first notches 156 of the bezel 15 and the second notches 104 of the bottom tray 10.

When the LCD device 1 is assembled, the liquid crystal panel 13 is accommodated in the first accommodating space and the backlight module 11 is accommodated in the second accommodating space. The first protrusions 166 engage the first notches 166 to fasten the liquid crystal panel 13. The second protrusions 164 engage the second notches 104 to fasten the backlight module 11.

However, the liquid crystal panel 13 is isolated from the backlight module 11 by the supporting plate 162, forming a space therebetween. The space increases a thickness of the LCD device 1. Moreover, the frame 116 complicates a manufacturing process of the LCD device 1, increasing cost of the LCD device 1.

What is needed, therefore, is an LCD device that can overcome the described limitations.

DETAILED DESCRIPTION

Reference will now be made to the drawings to describe various embodiments of the present disclosure in detail.

Figure 1:
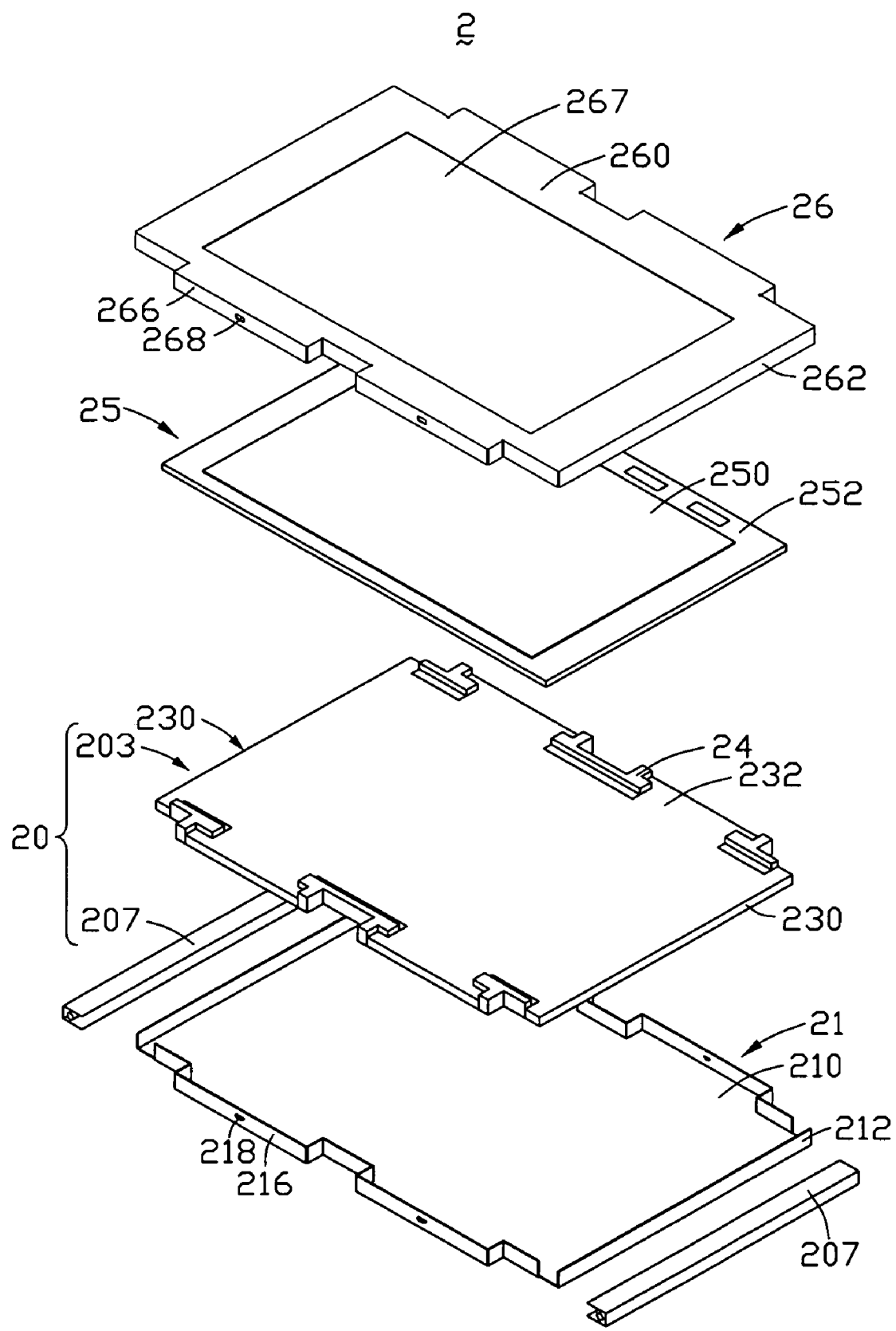
FIG. 1 is a schematic, exploded view of a first embodiment of an LCD device according to the present disclosure, the LCD device including a light guide plate, a plurality of blocks, and a liquid crystal panel.

FIG. 1 is a schematic, exploded view of a first embodiment of an LCD device according to the present disclosure. The LCD device 2 includes a backlight module 20, a bottom tray 21, a plurality of blocks 24, a liquid crystal panel 25, and a bezel 26. The bottom tray 21 engages the bezel 26 to accommodate the backlight module 20 and the liquid crystal panel 25. The liquid crystal panel 25 includes a central display region 250 and a peripheral non-display area 252. The bezel 26 includes a top plate 260.

The bottom tray 21 includes a bottom plate 210, two first sidewalls 212 opposite to each other, and two second sidewalls 216 opposite to each other. The four sidewalls 212, 216 extend perpendicularly from edges of the bottom plate 210. Each of the two second sidewalls 216 has a concavo-convex shape, and each includes two first protrusions 218. The top plate 260 of the bezel 26 defines a window 267 to expose the display region 250 of the liquid crystal panel 25. The bottom tray 21 is made from iron, aluminum (Al), or an alloy containing iron and Al.

The bezel 26 includes the top plate 260, two opposite third sidewalls 262, and two opposite fourth sidewalls 266. The four sidewalls 262, 266 extend perpendicularly from edges of the top plate 260. The fourth sidewalls 266 correspond to the second sidewalls 216. Each of the fourth sidewalls 266 includes two notches 268. The bottom tray 21 fixes with the bezel 26 through the first protrusions 218 engaging in the notches 268. The bezel 26 is made from iron, or an alloy containing iron and Al.

Figure 2:
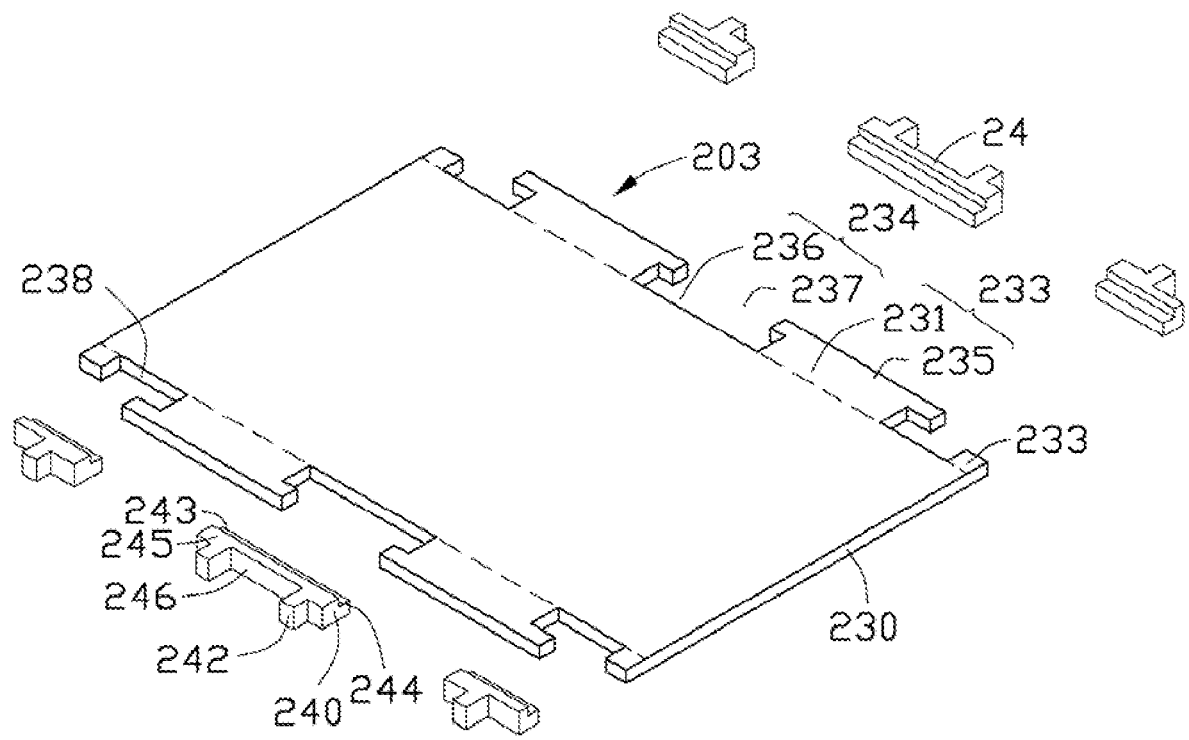
FIG. 2 is an enlarged, isometric view of the light guide plate and the blocks of FIG. 1.

Referring to FIG. 2, the backlight module 20 includes a light guide plate 203 and two light sources 207. The light guide plate 203 includes a top light emitting surface 232, two opposite light incident surfaces 230, and two sides 238. The light sources 207 are disposed adjacent to the light incident surfaces 230. The two sides 238 correspond to the second sidewalls 216 of the bottom tray 21. Each of the two sides 238 has a concavo-convex shape, thereby forming a plurality of second protrusions 233 and a plurality of cutouts 234. Each second protrusion 233 comprises a first protrusion portion 231 extending from a main body of the light guide plate 203, and a second protrusion portion 235 extending from the first protrusion portion 231. Each cutout 234 comprises an inner cutout portion 236 and an outer cutout portion 237. For a middle one of the cutouts 234, the inner cutout portion 236 is located between two corresponding first protrusion portions 231, and the outer cutout portion 237 located between two corresponding second protrusion portions 235. A length of the second protrusion portion 235 as measured along a direction parallel to the corresponding side 238 of the light guide plate 203 is greater than a length of the first protrusion portion 231 as measured along the direction parallel to the corresponding side 238 of the light guide plate 203. Accordingly, for the middle cutout 234, a length of the inner cutout portion 235 as measured along the direction parallel to the corresponding side 238 of the light guide plate 203 is greater than a length of the outer cutout portion 236 as measured along the direction parallel to the corresponding side 238 of the light guide plate 203. Only two second protrusions 233 and three cutouts 234 in each side 238 are shown in FIG. 2. The light guide plate 203 is made from polymethyl methacrylate (PMMA) or polycarbonate (PC).

The plurality of blocks 24 correspond to the cutouts 234. Each block 24 includes a fixing portion 240 and two extending portions 242. The fixing portion 240 has a stepped profile, which includes a first step surface 243, a second step surface 245, a side surface 244 interconnecting the first step surface 243 and the second step surface 245, and a back side 246. The two extending portions 242 extend from the back side 246 perpendicularly. The blocks 24 are made from rubber, plastic or other flexible material.

Figure 3:
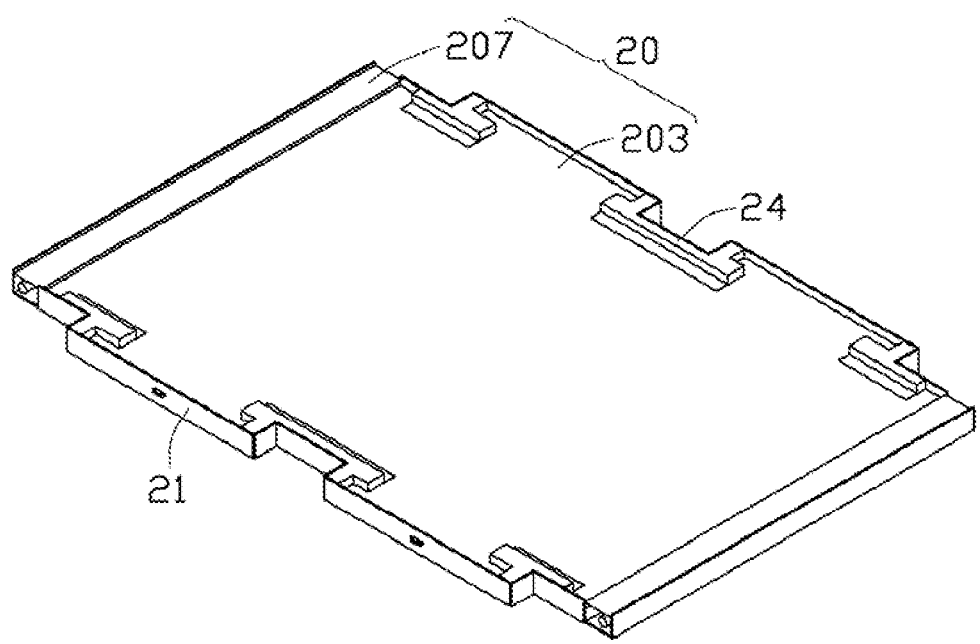
FIG. 3 is an assembly view of part of the LCD device of FIG. 1.
Figure 4:
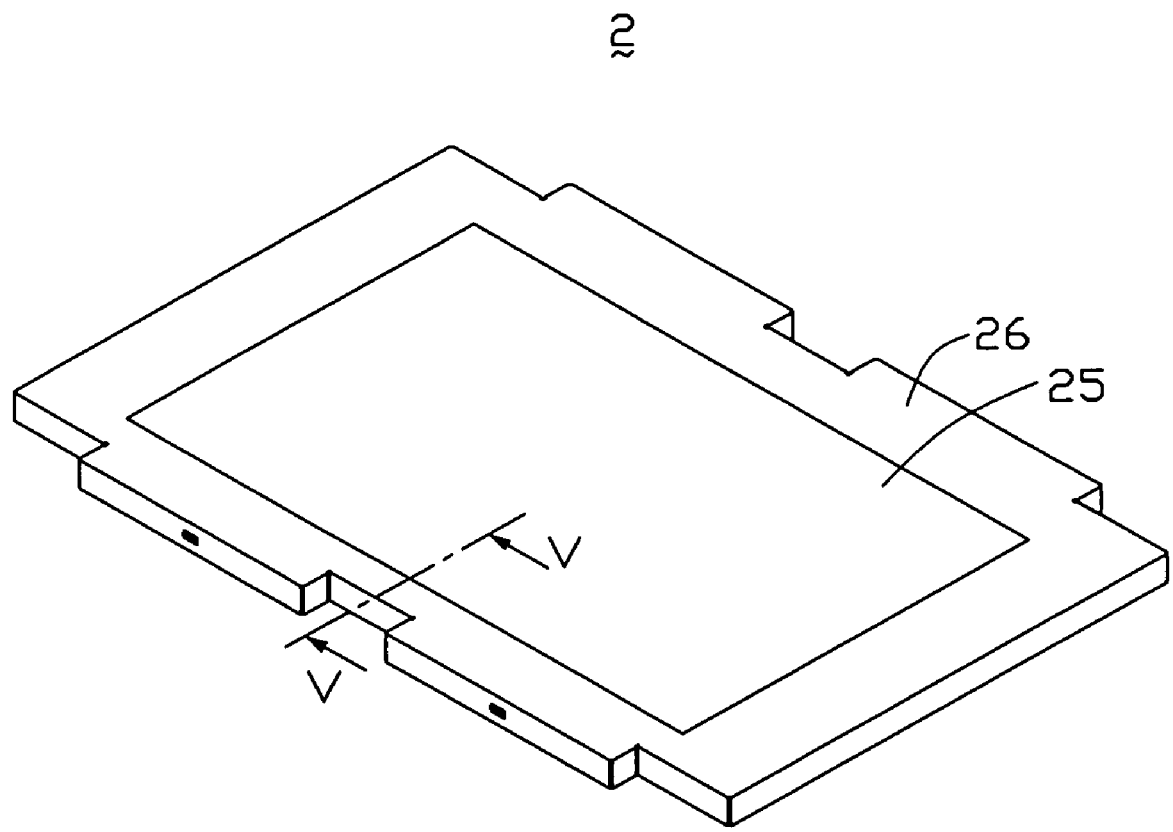
FIG. 4 is a completed assembly view of the LCD device of FIG. 1.
Figure 5:
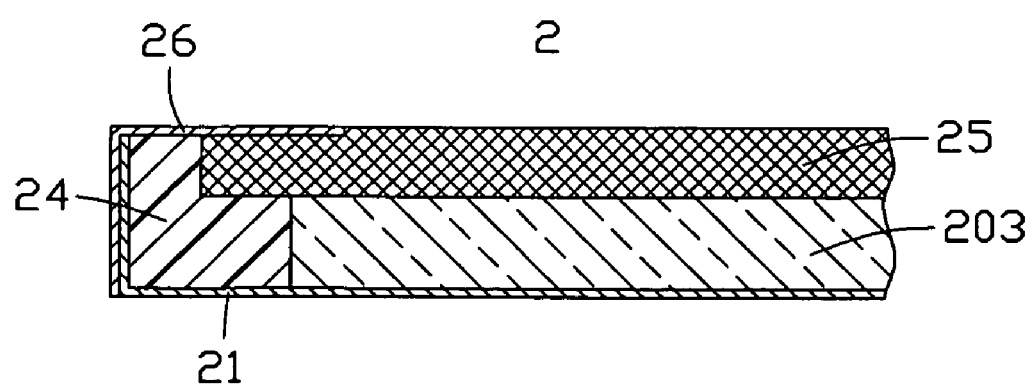
FIG. 5 is a cross-section of FIG. 4 taken along line V-V.

FIG. 3 is an assembled view of part of the LCD device 2 shown in FIG. 1, FIG. 4 is an assembled view of all of the LCD device 2 shown in FIG. 1, and FIG. 5 shows a cross-section of FIG. 4 taken along line V-V thereof. When the LCD device 2 is assembled, the light guide plate 203 is attached on the bottom plate 210. The light sources 207 are disposed between the light incident surface 230 and the first sidewalls 216. The second protrusions 233 and cutouts 234 correspond to the concave and convex portions of the second sidewalls 216, respectively. The fixing portion 240 of each block 24 engages in the corresponding cutout 234 of the light guide plate 203. The extending portions 242 of the blocks 24 engage the concavo-convex second sidewalls 216 so that the light guide plate 203 is fixed with the bottom tray 21. The first step surface 243 of each block 24 is at the same height as the light emitting surface 232. The first step surface 243 and the side surface 244 together with the light emitting surface 232 form an accommodating space. The liquid crystal panel 25 is accommodated in the accommodating space, and is adhered onto the first step surface 243 and the light emitting surface 232. A top surface of the non-display area 252 is at the same height as the second step surfaces 245. The bezel 26 covers the liquid crystal panel 25, and engages the bottom tray 21 by the first protrusions 218 being received in the corresponding notches 268. Thus, the liquid crystal panel 25 and the backlight module 20 are fixed between the bottom tray 21 and the bezel 26.

The liquid crystal panel 25 is directly attached on the light emitting surface 232 of the light guide plate 203, achieving assembly without a frame, resulting in enhanced thinness of profile, simplified manufacture, and reduced cost.

Figure 6:
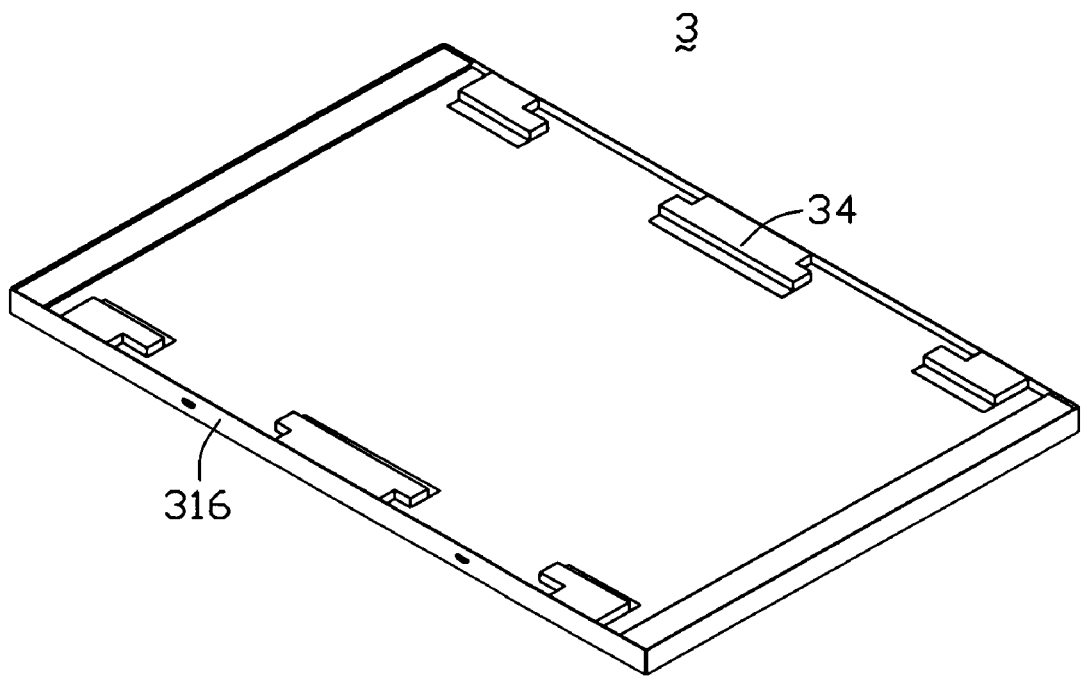
FIG. 6 shows a second embodiment of an LCD device according to the present disclosure.

FIG. 6 shows a second embodiment of an LCD device according to the present disclosure, differing from LCD device 2 only in that a second sidewall 316 of a bottom tray is straight, such that the blocks 34 include no extending portions, allowing the bottom tray to be molded more easily.

Figure 7:
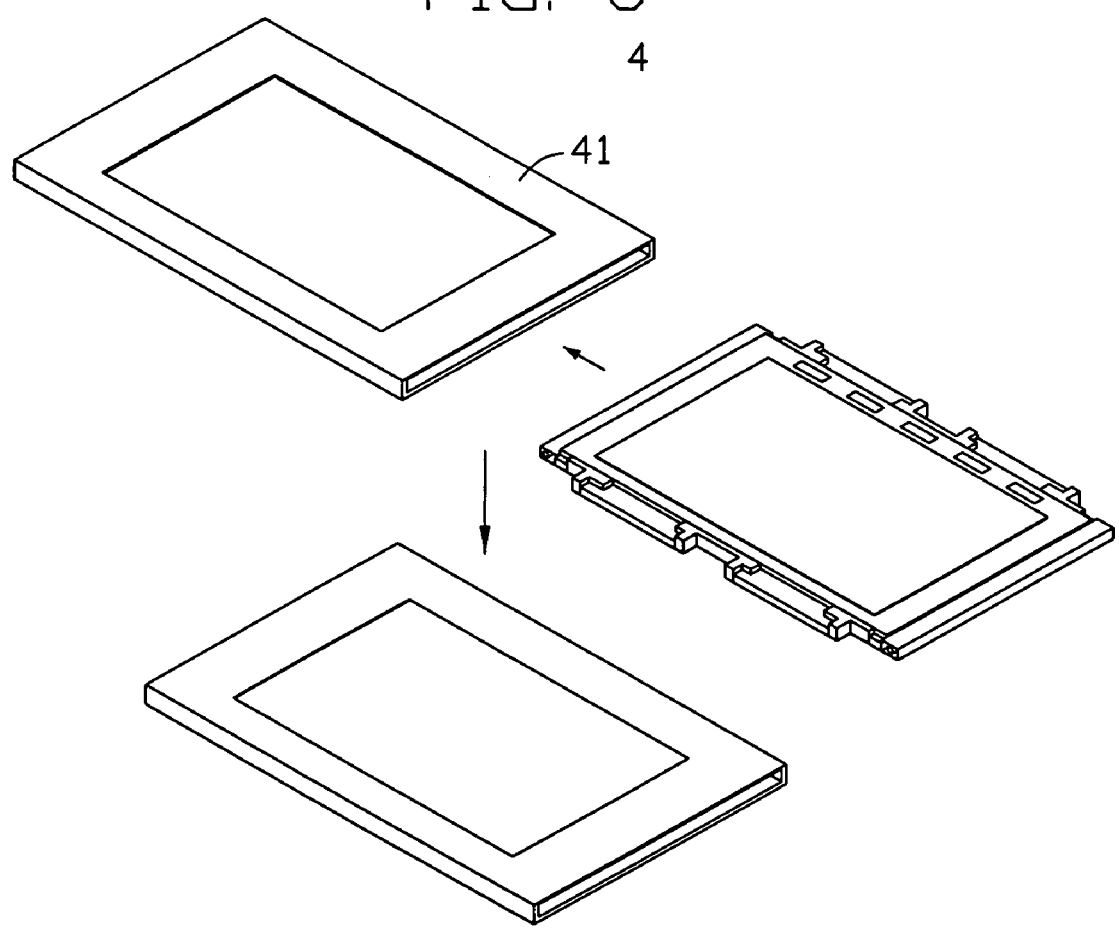
FIG. 7 shows a third embodiment of an LCD device according to the present disclosure.
Figure 8:
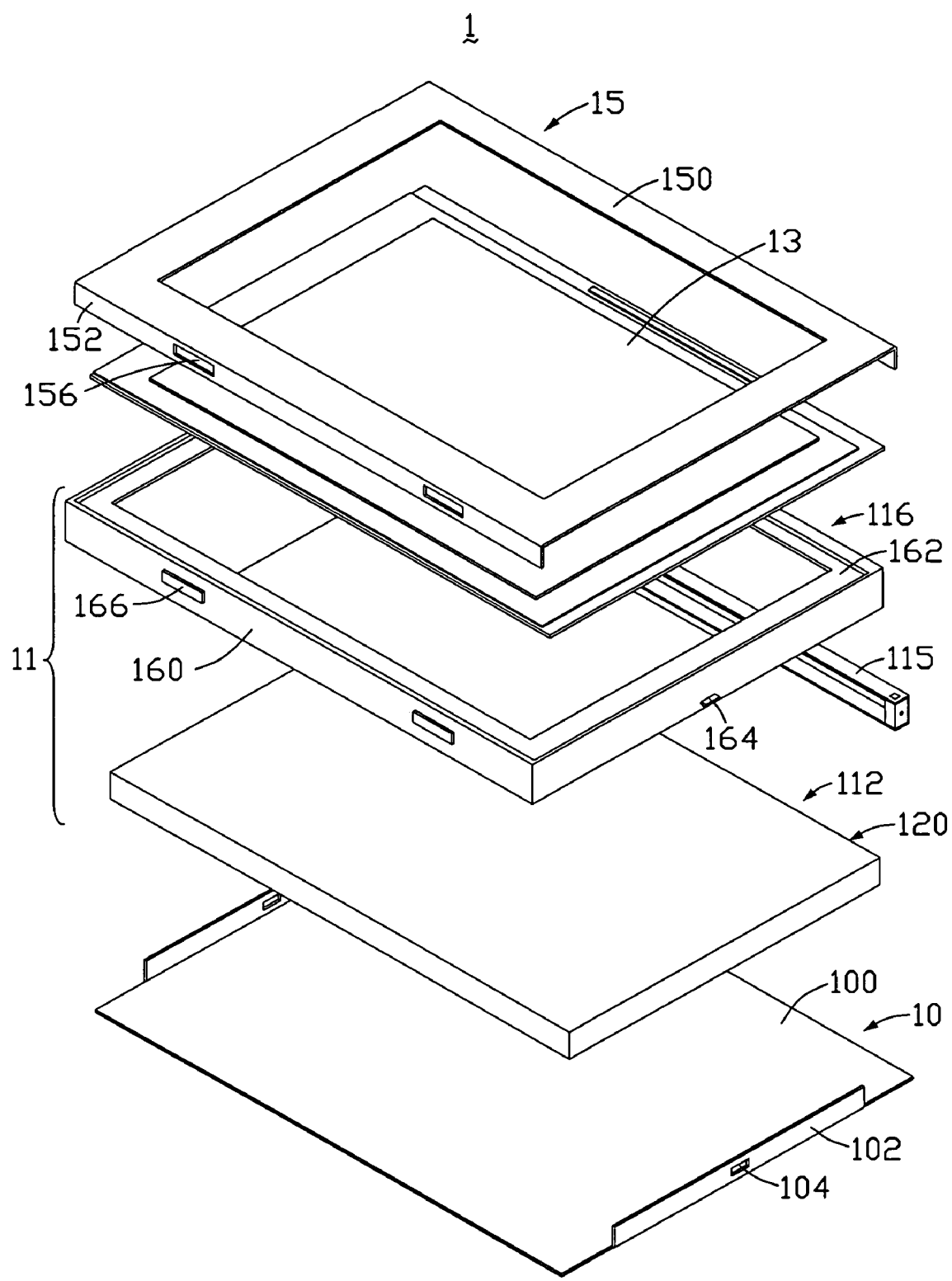
FIG. 8 is a schematic, exploded view of a commonly used LCD device.

FIG. 7 shows a third embodiment of an LCD device according to the present disclosure, differing from LCD device 2 only in that, here, LCD device 4 includes a box 41 to replace the bottom tray 21 and the bezel 26, in which an assembly including a backlight module and a liquid crystal panel is received from one side. Manufacture is thus simplified.

In further and/or alternative embodiments, the LCD device 2 may further include an optical assembly disposed between the liquid crystal panel 25 and the light guide plate 203, with the surface of the first step 243 higher than that of the light guide plate 203. Moreover, the blocks 24 and the light guide plate 203 may be molded as a one-piece member.

It is to be understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A liquid crystal display (LCD) device, comprising:
a liquid crystal panel comprising a peripheral non-display area, the peripheral non-display area having a top surface;
a light guide plate, comprising:
a top light emitting surface; and
a plurality of cutouts at two opposite sides of the light guide plate; and
a plurality of blocks engaged in the cutouts;
wherein each of the blocks comprises a fixing portion having a stepped profile, the fixing portion comprises a first step surface, a second surface, and a side surface interconnecting the first step surface and the second step surface, the liquid crystal panel is disposed on the first step surface, and the top surface of the peripheral non-display area of the liquid crystal panel is substantially coplanar with the second step surface.

2. The LCD device of claim 1, wherein the light guide plate further comprises a plurality of protrusions, and the protrusions extend from the two opposite sides of the light guide plate and cooperatively form the cutouts.

3. The LCD device of claim 2, further comprising a bottom tray comprising two opposite sidewalls corresponding to the two opposite sides of the light guide plate, wherein each of the two opposite sidewalls has a concavo-convex profile.

4. The LCD device of claim 1, wherein at least one of the cutouts comprises an inner cutout portion and an outer cutout portion, and a length of the inner cutout portion as measured along a direction parallel to the corresponding side of the light guide plate is greater than a length of the outer cutout portion as measured along the direction parallel to the corresponding side of the light guide plate.

5. A liquid crystal display (LCD) device, comprising:
a liquid crystal panel comprising a peripheral non-display area, the peripheral non-display area having a top surface;
a light guide plate, comprising:
a top light emitting surface; and
at least one cutout at at least one of two opposite sides of the light guide plate; and
at least one block engaging in the at least one cutout;
wherein the at least one block comprises a fixing portion having a stepped profile, the fixing portion comprises a first step surface, a second step surface, and side surface interconnecting the first step surface and the second step surface, the first step surface is substantially coplanar with the light emitting surface, the liquid crystal panel is attached on the first step surface and the light emitting surface, and the top surface of the peripheral non-display area of the liquid crystal panel is substantially coplanar with the second step surface.

6. The LCD device of claim 5, wherein the liquid crystal panel is adhered to the first step surface and the light emitting surface.

7. The LCD device of claim 5, further comprising a bottom tray comprising at least one sidewall corresponding to the at least one side of the light guide plate, wherein the at least one sidewall has a concavo-convex profile.

8. The LCD device of claim 5, wherein the at least one cutout comprises an inner cutout portion and an outer cutout portion, and a length of the inner cutout portion as measured along a direction parallel to the at least one side of the light guide plate is greater than a length of the outer cutout portion as measured along the direction parallel to the at least one side of the light guide plate.

9. A liquid crystal display (LCD) device, comprising:
a liquid crystal panel comprising a peripheral non-display area having a top surface;
a light guide plate comprising a light emitting surface, a plurality of cutouts being formed at two opposite sides of the light guide plate; and
a plurality of blocks received in the cutouts, each of the blocks comprising a fixing portion comprising a first step surface, a second step surface, and a side surface interconnecting the first step surface and the second step surface; wherein the liquid crystal panel is disposed on the first step surface with a part of the peripheral non-display area of the liquid crystal panel overlying the first step surface, the first step surface is substantially coplanar with the light emitting surface, and the second step surface is substantially coplanar with at least part of the top surface the peripheral non-display area of the liquid crystal panel.

10. The LCD device of claim 9, wherein the peripheral non-display area of the liquid crystal panel is directly supported by the first step surface and contacts the first step surface.

11. The LCD device of claim 9, wherein each of the blocks further comprises at least one extending portion extending from an outer lateral side of the fixing portion, and the at least one extending portion is configured for fixing the light guide plate to a bottom tray.

12. The LCD device of claim 11 wherein the fixing portion and the at least one extending portion are both entirely received in a corresponding one of the cutouts of the light guide plate in a top view of the LCD device.

13. The LCD device of claim 11, wherein at least one of the cutouts comprises an inner cutout portion and an outer cutout portion, and a length of the inner cutout portion as measured along a direction parallel to the corresponding side of the light guide plate is greater than a length of the outer cutout portion as measured along the direction parallel to the corresponding side of the light guide plate.

14. The LCD device of claim 13, wherein the fixing portion of at least one of the blocks is received in the inner cutout portion of the corresponding cutout, and the at least one extending portion of the at least one of the blocks is received in the outer cutout portion of the corresponding cutout.

15. The LCD device of claim 14, wherein a width of the inner cutout portion as measured along a direction perpendicular to the corresponding side of the light guide plate is greater than a width of the outer cutout portion as measured along the direction perpendicular to the corresponding side of the light guide plate.

16. The LCD device of claim 15, wherein the light guide plate further comprises a plurality of protrusions, and the protrusions extend from the two opposite sides of the light guide plate and cooperatively form the cutouts.

17. The LCD device of claim 16, wherein each of the protrusions comprises a first protrusion portion extending from a main body of the light guide plate, and a second protrusion portion extending from the first protrusion portion, and a length of the second protrusion portion as measured along the direction parallel to the corresponding side of the light guide plate is greater than a length of the first protrusion portion as measured along the direction parallel to the corresponding side of the light guide plate.

18. The LCD device of claim 17, wherein an extending length of the first protrusion portion is substantially equal to the width of the inner cutout portion of the corresponding cutout, and an extending length of the second protrusion portion is substantially equal to the width of the outer cutout portion of the corresponding cutout.

19. The LCD device of claim 18, further comprising the bottom tray, wherein the bottom tray comprises two opposite concavo-convex sidewalls, each of the concavo-convex sidewalls comprises hollow protrusions forming internal receiving spaces, and the internal receiving spaces receive the extending portions of the corresponding blocks and the second protrusion portions of the corresponding protrusions of the light guide plate.

20. The LCD device of claim 19, wherein the bottom tray further comprises a bottom plate, and two opposite strip sidewalls between the concavo-convex sidewalls, the bottom plate, the strip sidewalls and the concavo-convex sidewalls cooperatively form a main receiving space, and the main receiving space receives the main body of the light guide plate, the first protrusion portions of the protrusions of the light guide plate, and the fixing portions of the blocks.

* * * * *